(12) United States Patent
Bustamante

(10) Patent No.: US 12,330,756 B2
(45) Date of Patent: Jun. 17, 2025

(54) DENSE FLUIDS FOR BALLASTS

(71) Applicant: Magellan & Barents, S.L., Oviedo (ES)

(72) Inventor: Ciriaco P Bustamante, Oviedo (ES)

(73) Assignee: MAGELLAN & BARENTS, S.L., Oviedo (ES)

( * ) Notice: Subject to any disclaimer, the term of this patent is extended or adjusted under 35 U.S.C. 154(b) by 0 days.

(21) Appl. No.: 18/358,008

(22) Filed: Jul. 24, 2023

(65) Prior Publication Data

US 2023/0391426 A1  Dec. 7, 2023

Related U.S. Application Data

(63) Continuation-in-part of application No. 18/096,127, filed on Jan. 12, 2023, now Pat. No. 12,215,661, and a continuation-in-part of application No. 17/068,801, filed on Oct. 12, 2020, now Pat. No. 11,365,713.

(60) Provisional application No. 63/391,330, filed on Jul. 22, 2022.

(51) Int. Cl.
*B63B 39/03* (2006.01)
*B63B 35/44* (2006.01)

(52) U.S. Cl.
CPC ........ *B63B 39/03* (2013.01); *B63B 2035/442* (2013.01); *B63B 2035/446* (2013.01)

(58) Field of Classification Search
CPC .............. B63B 39/03; B63B 2035/442; B63B 2035/446
See application file for complete search history.

(56) References Cited

U.S. PATENT DOCUMENTS

| 2011/0037264 A1* | 2/2011 | Roddier | B63B 39/03 290/55 |
| 2015/0367918 A1 | 12/2015 | Roddier et al. | |
| 2019/0367136 A1 | 12/2019 | Gatescoupe et al. | |

FOREIGN PATENT DOCUMENTS

| CN | 113815797 A | 12/2021 | |
| EP | 4112439 A1 | 1/2023 | |
| WO | WO-2018037139 A1 * | 3/2018 | F03D 13/25 |

OTHER PUBLICATIONS

WO 2018037139 translation (Year: 2018).*

* cited by examiner

*Primary Examiner* — Viet P Nguyen
(74) *Attorney, Agent, or Firm* — HORIZON IP PTE. LTD.

(57) ABSTRACT

Disclosed are dense fluids for use in offshore applications, such as wind turbine platforms, oil and gas platforms, gravity anchors, catenary weights as well as other gravity-based structures. The dense fluid can be mixed with low-density fluid and high-density solid particles to form an intermediate dense fluid. The intermediate dense fluid is mixed with intermediate-density solid particles having the same density as the intermediate dense fluid to form a dense fluid with the desired target density. The dense fluid can be produced cost-effectively by selecting intermediate-density particles which are plentiful and can be obtained cheaply.

19 Claims, 4 Drawing Sheets

DENSE FLUIDS FOR BALLASTS

CROSS-REFERENCE TO RELATED APPLICATION

This application is a continuation-in-part of the U.S. Patent Application filed on Oct. 12, 2020, with application Ser. No. 17/068,801, titled "Pumped Hydro Energy Storage System and Method". This application is also a continuation-in-part of the US Patent Application filed on Jan. 12, 2023, with application Ser. No. 18/096,127, titled "Pumped Hydro Energy Storage System and Method, including Fire Extinguishing Features". This application also claims the benefit of U.S. Provisional Application No. 63/391,330, filed on Jul. 22, 2022. All disclosures are herein incorporated by reference for all purposes.

FIELD OF THE INVENTION

The present disclosure generally relates to offshore wind power turbines and other floating structures as well as gravity-based structures. In particular, the disclosure relates to using dense fluids in ballasts for offshore wind power turbines, other floating structures and gravity-based structures to provide cost-effective solutions. Furthermore, the ballasts and structures can be easily recovered from the seabed or the bottom of lakes and estuaries.

BACKGROUND

Global warming has generated significant concerns for the long term survivability of the Earth. A major cause of global warming is the generation of greenhouse gases, including water vapors, carbon dioxide ($CO_2$), methane, nitrous oxide and chlorofluorocarbons (CFCs). A key culprit for the $CO_2$ emission into the Earth's atmosphere is the burning of fossil fuels. Fossil fuels are used in many applications, including the generation of electricity.

To reduce global warming, a growing movement toward green energy evolved. One type of green energy includes generating electricity using wind power turbines. Consequently, numerous wind power farms have spawned, both on land and offshore. For example, as of 2022, worldwide offshore wind turbine capacity is about 64.3 gigawatts (GWs). Offshore wind power turbines, such as in oceans, lakes or large bodies of water, are more efficient due to the higher wind speeds offshore.

However, currently, offshore wind turbines generate only a small amount of the overall output due to their higher cost compared to onshore wind turbines. This is because the foundation of the offshore wind turbines is fixed to the bottom of the water, such as the sea or lake, significantly increasing costs. Furthermore, as the location of the wind turbines is located deeper, the higher the cost.

From the foregoing discussion, it is desirable to provide a cost-effective way to generate electricity using offshore wind turbines.

SUMMARY

Cost-effective offshore wind power generation is disclosed. One embodiment is related to a semisubmersible platform. The platform includes at least three elongated hollow columns, a floating frame for bracing the hollow columns together to form a polygon, and dense fluid contained in the hollow columns. The dense fluid is configured to cause the columns to float. The hollow columns containing the dense fluid, which are braced together, form a floating unit of the semisubmersible platform. The use of dense fluid as a ballast enables the hollow columns to be smaller in volume compared to the use of seawater as the ballast. In another embodiment a gravity anchor or other type of gravity-based structure Another embodiment is related to a method of generating electricity. The method includes installing an offshore wind turbine platform on a body of water. The wind turbine platform includes a floating unit having at least three elongated hollow columns, a floating frame for bracing the hollow columns together to form a polygon, and dense fluid contained in the hollow columns. The dense fluid is configured to cause the columns to float. By using dense fluid as a ballast, the volume of the hollow columns can be smaller compared to using seawater as the ballast. A wind turbine unit disposed on the floating unit. The wind turbine unit is configured to generate electricity using wind power to turn a rotor assembly of the wind turbine unit. The electricity generated by the wind turbine unit is transmitted to an onshore substation.

Yet another embodiment is related to a gravity anchor. The gravity anchor includes a container having first and second openings. The openings can be configured to be opened or closed. DF fills the container, causing the gravity anchor to sit on the seabed.

These and other advantages and features of the embodiments herein disclosed will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily drawn to scale, with emphasis instead generally being placed upon illustrating the principles of the invention.

DETAILED DESCRIPTION

Figure 1:
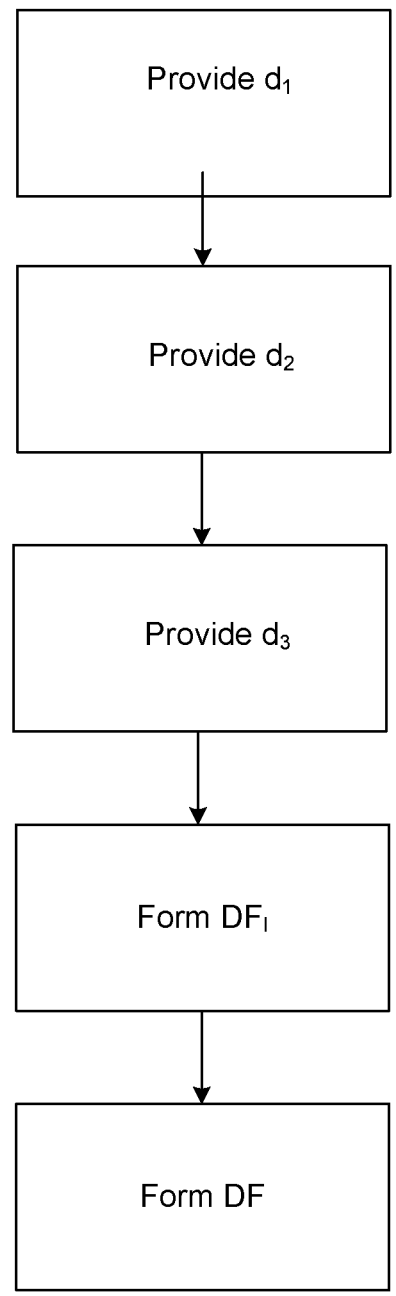
FIG. 1 shows a simplified process of forming a dense fluid.

Embodiments to offshore wind turbines and ballast fill materials using a dense fluid. The dense fluid, for example, has a density greater than that of water or seawater. The density can be varied for different applications. In the case of ballast fill materials, such as for offshore wind turbines, the density can range from 1.2 $g/cm^3$ to 3-4 $g/cm^3$ or even greater. For example, the dense fluid may be a low-density dense fluid, such as about 1.2 $g/cm^3$, for applications which replace seawater as the ballast fill material. Using the presently described dense fluid as a replacement for seawater is advantageous as it does not require biocides since it does not contain living organisms. In active ballast applications, the dense fluid may be an intermediate-density dense fluid with a density of about 1.5-2.5 $g/cm^3$. A high-density dense fluid having a higher density, such as about 2.5-3 gm/cm$^3$ or even higher may be employed for passive ballast applications. Higher density dense fluids may also be used for other applications, such as 5-7 g/cm$^3$ or even higher.

Although the dense fluids are described for use as ballast fill materials for ballasts in offshore wind turbines, the dense fluids may be employed in other applications. For example, the dense fluids may be employed in semi-submersible platforms for offshore wind or offshore oil and gas applications, gravity anchors, dead loads to keep a catenary taut or other types of gravity-based structures. The dense fluids may also be employed in pumped hydropower storage applications, as described in U.S. patent application Ser. No. 17/068,801, which is already herein incorporated by reference. Embodiments also relate to stable and cost-effective dense fluids.

In one embodiment, a stable dense fluid DF includes the following formulation:

$$DF=(P_1)d_1+(P_2)d_2+(P_3)d_3,$$

where
$d_1$=low-density fluid having density $D_1$;
$d_2$=intermediate-density particles having density $D_2$;
$d_3$=high-density particles having density $D_3$;
$P_1$=volume percentage of $d_1$;
$P_2$=volume percentage of $d_2$;
$P_3$=volume percentage of $d_3$; and
$D_1<D_2<D_3$.

A target density $D_T$ of the DF is less than the density of $D_3$ and higher than $D_1$. In one embodiment, $D_T$ is selected to provide increased density but is still capable of being flowable. For example, $D_T$ is a density compatible with fluidity. The $D_T$ of DF, for example, may be about 1.2-7 times the specific gravity of water. For example, the DF may be a low-density DF, intermediate-density DF or high-density DF, depending on the application. Providing DF with other densities may also be useful.

In one embodiment, $d_1$ may be water. Other types of low-density fluids may also be useful. For Example, low-density fluids, such as dunite mud, may also be useful. Water, for example, has a density ($D_1$) of about 1 g/cm$^3$. As for $d_3$, the high-density solid particles have a density higher than $D_T$. In one embodiment, high-density particles may have a density $D_3$ of about 4.5-5 g/cm$^3$. For example, $d_3$ may include baryte, magnetite or a combination thereof. Other types of high-density particles having other $D_3$s may also be useful. The value of $D_3$, for example, may depend on the application. A higher $D_T$ may require $d_3$ to have a higher $D_3$. For example, higher density high-density particles, such as lead pellets, steel pellets, tungsten pellets, depleted uranium pellets or a combination thereof, may be employed for higher DTs.

In one embodiment, $(P_1)d_1+(P_3)d_3$ produces an intermediate dense fluid $DF_I$ with an intermediate-density $D_I$. In one embodiment, intermediate-density solid particles $d_2$ are added to $DF_I$ to increase $D_I$ to $D_T$. For example, the addition of $d_2$ to $DF_I$ produces a DF with $D_T$. The volume of $d_2$ added to DFI should result in $D_F$ with $D_T$. The amount of $d^2$ added depends on, for example, $D_I$ and $D_T$.

The intermediate-density particles $d_2$, in one embodiment, include solid particles (the same or different types) having a density equal to about $D_2$. In one embodiment, $d_2$ is selected to have a $D_2$ which results in $d_2$ having a neutral buoyancy in $DF_I$. In the case where the $D_I$ of $DF_I$ is stable, $d_2$ is selected to have a $D_2$ which is about equal to about $D_I$. For example, $D_2$ should be within about ±1-5% of $D_I$. Preferably, $D_2$ should be within about ±1% of $D_I$. As such, selecting $d_2$ to have a neutral buoyancy will not impede the flow of the resulting DF when $d_2$ is added to $DF_I$.

In one embodiment, $d_2$ may include dunite, calcite, dolomite or a combination thereof. For example, $d_2$ may have a density of about 2.8 g/cm$^3$. For example, 2.8 g/cm$^3$ can be used to produce a DF having a density of about 3-4 times the specific gravity of water from $DF_I$ with a density of 2.8 g/cm$^3$. Producing a DF with other specific gravities relative to water may also be useful. Other types of $d_2$ may also be useful. For example, $d_2$ may depend on $D_I$ and cost. Preferably, $d_2$ is selected to have a relatively low cost compared to $d_3$ based on $D_I$. For higher DTs, $d_3$ may be selected based on the needs of the specific application.

To improve the stability of the solid particles, they may optionally be coated with a tensoactive coating. The tensoactive coating can be employed to impede flocculation to stabilize DF, thereby improving the flowability of DF. Other techniques for improving the stability and flowability of DF may also be useful. For example, mixing $d_3$ with mud, such as dunite mud having a density of about 1.2 g/cm$^3$, has been found to be effective to improve the stability of the particles. The size of the particles in the dunite mud may be about 60 um or less.

The size of the solid particles may be about several tens of microns to 1 cm or more in diameter. Other sizes for the high-density particles may also be useful. Regarding $d_2$, the size may be about 10-100 um. For example, the diameter of $d_2$ may be about 10-100 um. It is understood that the particles may not be perfectly spherical. Preferably, the size of $d_2$ is about 10-60 um. As for $d_3$, in the case of a Bingham plastic, it can be up to 1 cm or larger. Preferably, $d_3$ may be up to 1 cm in the case of a Bingham plastic. For non-Bingham plastic applications, the size of $d_3$ may be about 60 um or less. Other sizes for $d_2$ and $d_3$ may also be useful.

In the case that the particles are minerals supplied by mining companies, they may come in a broad range of sizes, such as from several microns to more than 1 cm. If they are too large, processing may be performed to reduce the sizes of the particles to improve the flowability of DF. Size reduction of the particles may be performed in multiple stages, with the final stage achieving the desired maximum size of the particles. It is understood that $d_2$ and $d_3$ are processed separately and that they need not have the same final maximum size. In some cases, to reduce cost, it is acceptable to have a broad range of sizes for the particles while maintaining flowability. For example, the DF may be configured as a Bingham plastic to ensure that larger particles do not sink.

As an example, a DF may include water as $d_1$. As discussed, water has a density of about 1 g/cm$^3$. For purposes of simplification, water can be associated with a density of 1 g/cm$^3$. High-density solid particles $d_3$ are mixed with $d_1$ to produce an intermediate dense fluid $DF_I$ having a density of $D_I$. Mixing, for example, may include mechanical blending, similar to that employed to form concrete. In one embodiment, $d_3$ is selected to have a density of about 5 g/cm$^3$. For example, $d_3$ may be baryte. Alternatively, $d_3$ may be magnetite. Other types of high-density particles having a density of about 5 g/cm$^3$ may also be useful. In addition, selecting $d_3$ having other densities may also be useful. For example, $d_3$ may have a density higher than 5 g/cm$^3$. In some embodiments, $d_3$ may have a lower density than 5 g/cm$^3$.

In one embodiment, $DF_I$ has a $D_I$ of about 2.8 g/cm$^3$. The intermediate dense fluid $DF_I$ includes a mixture of dunite mud with a density of about 1.2 g/cm$^3$ and magnetite, which has a density of about 5.2 g/cm$^3$. In one embodiment, $DF_I$ includes about 60% volume of dunite mud and 40% volume of magnetite, producing a $DF_I$ with a density $D_I$ of about 2.8 g/cm$^3$. Intermediate-density solid particles $d_2$ may include dunite. Other types of $d_2$, such as calcite, dolomite or a combination of des, may also be useful.

In other embodiments, higher DTs can be achieved by using $d_3$ with a higher density. For example, $d_3$ may be metal particles, such as iron filings or lead particles. In such cases, a density of 6-7 times or greater than the specific gravity of water can be obtained. Other densities can be achieved by selecting the appropriate $d_1$, $d_2$ and $d_3$.

In one embodiment, the DF can be handled or its flow induced with compressed air. For example, the movement of the DF can be facilitated by compressed air. Due to the cohesiveness of the DF, it can flow at high speeds through a pneumatic circuit system, such as pipes and tanks. This has been demonstrated empirically by injecting compressed air at several Bar pressure into the bottom of a vertical 4-inch diameter pipe having a DF with a density of 4 g/cm$^3$. For example, the air blast pushes the mass without any bubbles and carries the DF at a high speed, such as more than 1 m/s. For example, the DF flows as lumps and can be flowed using less low pressure, such as less than 8 Bar.

Unlike $d_3$, $d_2$ can be selected from readily available low-cost minerals. By producing a DF with $D_T$ using a combination of $d_2$ and $d_3$, lower production costs can be achieved.

As described, a DF system which includes $d_1$, $d_2$ and $d_3$ is provided. The DF system imparts flexibility. For example, by appropriately selecting the $d_2$ and $d_3$ using water or other types of fluids, the desired $D_T$ can be achieved based on the application. Furthermore, the components of the system can be selected to reduce costs significantly while achieving a DF with the desired $D_T$. Moreover, the DF can be handled using compressed air, making their application simple and easy, as well as being energy efficient, making the DF very cost-effective.

FIG. 1 shows a process flow 100 for forming DF with the desired $D_T$. At 110, a low-density fluid is provided. The low-density fluid, for example, may be water. Other types of low-density fluids may also be useful. For example, a low-density fluid, such as dunite mud may also be used. The dunite mud, for example, is configured with a density of 1.2 g/cm$^3$.

At 120, intermediate-density solid particles $d_2$ are provided. In one embodiment, $d_2$ may have a density of about 2.8 g/cm$^3$. Providing $d_2$ with other densities may also be useful. In the case that $d_2$ includes different types of intermediate-density solid particles, the average density may be about 2.8 g/cm$^3$. It is understood that the variance of the densities of different $d_2$s should not vary too much, such as within about ±1-5%. Preferably, the variance of the densities of the different $d_2$s should be within about ±1%. The intermediate-density particles, for example, $d_2$ may include dunite, calcite, dolomite or a combination thereof. Other types of $d_2$ particles may also be useful. The intermediate density solid particles $d_2$ may be larger than, for example, particles of the mud of $d_1$, such as several tens of microns to 1 cm or more. The intermediate particles may be optionally coated with a tensoactive coating. Providing $d_2$ without a tensoactive coating may also be useful.

High-density solid particles $d_3$ are provided at 130. For example, $d_3$ may have a density of about 5 g/cm$^3$. Providing $d_3$ with other densities may also be useful. The high-density solid particles may include different types of $d_3$. The variance of the densities should be, for example, within about ±1-5%. Preferably, the variance should be within about ±1%. The intermediate-density particles, for example, $d_2$ may baryte, magnetite or a combination thereof. Other types of $d_3$ particles may also be useful. The high-density particles $d_3$ may be optionally coated with a tensoactive coating. Providing $d_2$ without a tensoactive coating may also be useful.

In one embodiment, at 140, an intermediate dense fluid $DF_I$ is formed. Forming $DF_I$ includes mixing $d_1$ with $d_3$. Mixing, for example, may be mechanical blending. Other mixing techniques may also be useful. As discussed, $d_1$ may be water. In other embodiments, $d_1$ may be dunite mud. In one embodiment, $d_1$ is a Bingham plastic, such as dunite mud. Other types of Bingham plastic low-density fluids may also be useful. When a Bingham plastic is used, $d_3$ need not be coated with a tensoactive coating. The intermediate dense fluid has a density of $D_I$. In one embodiment, $D_I$ is about 2.8 g/cm$^3$. Other values for $D_I$ may also be useful.

At 150, $D_I$ is mixed with $d_2$ to for DF with the desired $D_T$. For example, $d_2$ is mechanically blended with $D_I$. In one embodiment, $d_2$ has a density $D_2$ equal to about $D_I$. In the case of a Bingham plastic, $d_2$ need not be coated with a tensoactive coating. Furthermore, in the case of a Bingham plastic, the solid particles do not exceed the sheering stress required to flow. As such, they remain suspended in the DF. To flow the DF, compressed air may be employed.

Figure 2:
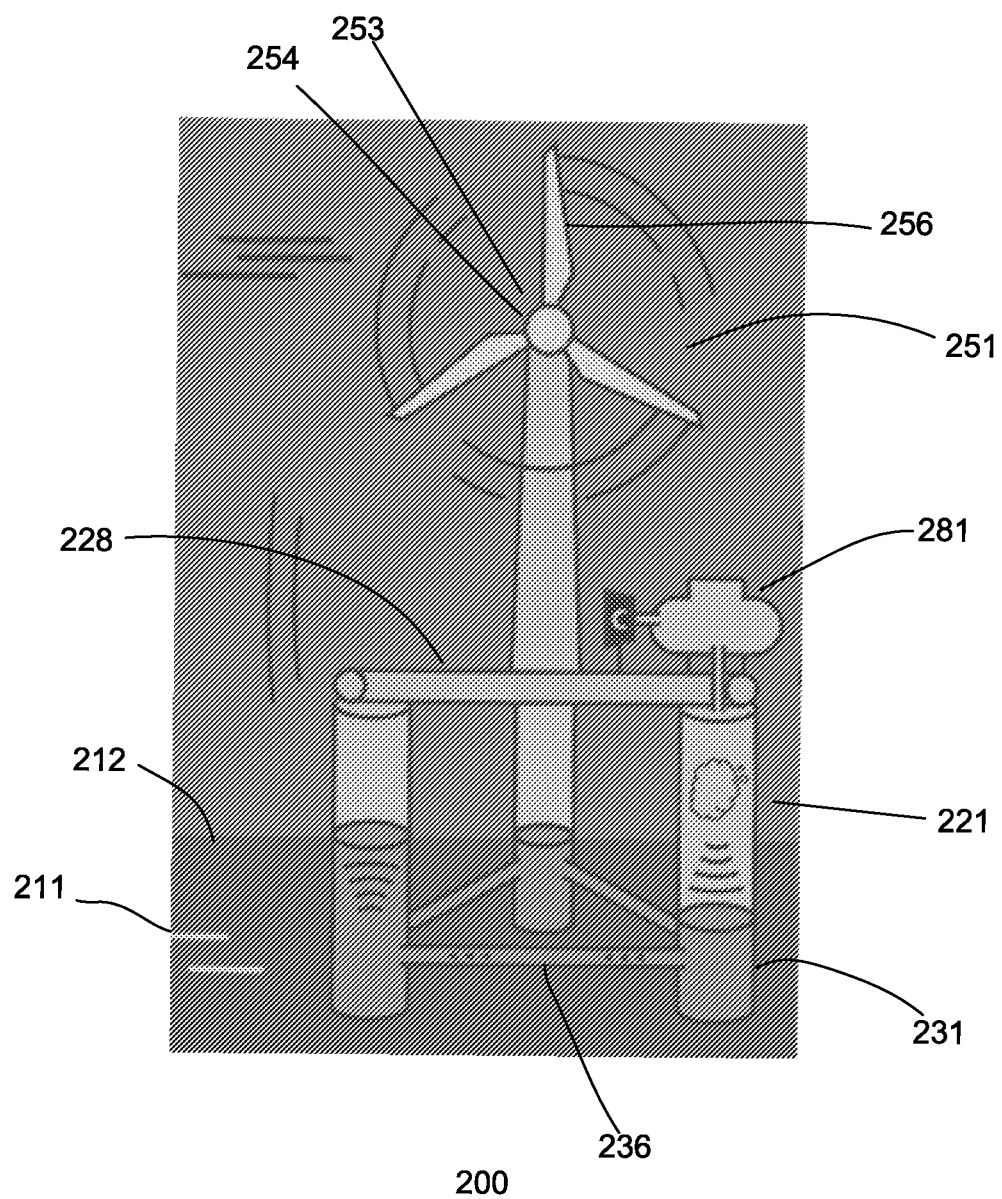
FIG. 2 shows a simplified embodiment of an offshore wind turbine system.

FIG. 2 shows a simplified embodiment of an offshore or floating wind turbine system or platform 200. The offshore wind turbine system is configured to be a semi-submersible floating wind turbine system. For example, the system is configured to float on a body of water 211. As shown, the system includes a floating platform or module 221 configured to float on water. The floating module, for example, is a semi-submersible module, with a lower portion disposed beneath the waterline 212 and an upper portion disposed above the waterline.

The floating module is further configured to support a wind turbine module 251. The wind turbine module, for example, may be any conventional wind turbine module mounted onto the floating module. For example, the wind turbine module includes a wind turbine tower. A nacelle 253 or turbine head is disposed on a top of the turbine tower. A rotor blade assembly 254 is attached to the nacelle. The nacelle may house a gearbox assembly, an aerodynamic braking unit, a mechanical braking unit, a turbine generator unit and an electrical power transmission unit. Providing the nacelle with other units or subsystems may also be useful.

In some embodiments, the nacelle can be a rotating nacelle. For example, the nacelle can be configured to rotate around the axis of the turbine tower. This enables the rotor blade assembly to rotate into the wind to maximize power generation. In addition, blades 256 of the rotor blade assembly may be configured with pitch adjustability. For example, the pitch of the blades may be adjusted to maximize power generation. In the case of strong winds, the pitch may be adjusted to ensure that the rotor blade assembly doesn't over-rotate. The pitch control of the blades may be, for example, part of the aerodynamic braking unit or in addition to other aerodynamic braking features.

As for the floating module, it includes a plurality of columns 231 which are braced together to form a semi-submersible platform for the wind turbine module. The columns, in one embodiment, contain ballasts for the semi-submersible platform. In one embodiment, as shown, the columns are hollow elongated cylindrical-shaped tanks serving as floatation or ballast tanks. Other shaped elongated tanks which can contain the ballasts may also be useful. The elongated tanks, for example, may be cylindrical. Other column shapes may also be useful.

The floating module, in one embodiment, includes 3 columns. Providing more than 3 columns may also be useful. For example, the floating module may include 3 to 5 columns. The dimensions of the columns should be sufficient to serve as ballast tanks for the floating module to support the wind turbine module. The dimensions of the columns, for example, may depend on the weight of the wind turbine module and other components of the system as well as the number of columns. For example, the heavier the weight of the module it is configured to support, the larger the required volume. The volume may be reduced or increased due to the number of columns.

In one embodiment, the columns are braced together by a platform frame to structurally result in a stable semi-submersible platform capable of supporting the wind turbine module and other components of the offshore wind turbine system. The platform frame, for example, may be configured as a trellis frame, with braces forming the trellis frame to brace the columns together. Other types of platform frames may also be useful. The columns, for example, may be configured in a triangular-shaped, rectangular-shaped or pentagonal-shaped structure. Other geometric-shaped structures may also be useful. For example, the shape may depend on the number of columns. In one embodiment, the columns are configured in a vertical configuration. For example, the length of the column is configured in a vertical plane which is perpendicular to the surface plane of the water.

The columns are filled with DF. For example, the DF has a formulation $(P_1)d_1+(P_2)d_2+(P_3)d_3$, as already described. The use of DF is advantageous as it allows the use of shorter columns compared to those filled with water or seawater. For example, the volume of the columns required is smaller than those used for water or seawater. Water or seawater has a density slightly below or above 1 g/cm$^3$. On the other hand, the DF can have a specific gravity of, for example, 2-3 times, or even greater, than that of water or seawater. As such, the volume of the columns can be reduced by a proportionate amount. For example, for a given diameter, the length of the columns can be reduced by a proportionate amount. However, there is a minimum length for the columns. As such, the diameter of the columns may be reduced.

In some embodiments, the columns may be filled with a low-density DF, such as one with a density of 1.2 g/cm$^3$. Although the density is low-density, it is still advantageous over water or seawater applications. For example, since the DF has no living organisms, it does not need biocides. In addition, the DF can be moved using compressed air, unlike seawater or water. The use of compressed air requires less energy compared to pumps for seawater or water solutions.

In one embodiment, the columns of the floating module are in fluid communication. Such a configuration enables the columns collectively to form an active ballast. For example, the fluidic connected columns are configured to form an active ballast sub-system of the offshore wind turbine system. As shown, flow conduits or pipes 236 interconnect the blasts. For example, each ballast is interconnected to adjacent columns by flow conduits. The flow conduits are located below the water line or at least below the height of the DF. Other configurations of flow conduits may also be useful. The dimensions of the flow conduits should be sufficient to enable efficient and effective transfer of DF between the columns. The dimensions of the flow conduits, for example, may depend on the fluidic rheology of the DF.

A top of the floating module may include a deck 228. The deck, for example, may provide a surface on the floating module to support some of the components of the offshore wind turbine. In some cases, the tops of the columns may serve as the deck. For example, the deck may include multiple sub-decks formed by the tops of the columns. In one embodiment, the wind turbine system may include a ballast controller and an actuator unit 281. The actuator unit, in one embodiment, includes a compressor and pressure vessel for storing the compressed air. The actuator unit, for example, is employed to generate compressed air to move the DF within the active ballast subsystem. The ballast controller controls the compressor to selectively inject compressed air into the active ballast system to provide active leveling of the system. In addition, the deck may include solar panels and a power storage unit to provide power to operate the components, such as the ballast controller and the actuator unit compressor as well as other components which require power.

In one embodiment, the actuator unit is in communication with the columns through their top surfaces. Valves may be provided to control which column is provided with compressed air from the top. As compressed air is provided to a selected column, DF is shifted therefrom through the flow conduits to other columns to provide active ballasting to level the system. For example, air is injected into one or more columns in which we want to reduce DF and air is vented from one or more columns in which we want to increase DF. An active ballast controller may be employed to control the actuator unit based on sensors to provide active ballasting. For active ballasting applications, the top of the columns may be reinforced to ensure that the columns can handle the injection of compressed air.

Using compressed air, leveling can be achieved within 1 to 2 minutes. Furthermore, less power is required using compressed air versus water pumps for water or seawater applications. For example, a 7.5 KW compressor would be sufficient, compared to a 30 KW pump required for seawater applications. As such, only 25% of the power is needed compared to seawater pump solutions.

In one embodiment, the wind turbine module is disposed on top of one of the columns. The column on which the wind turbine module is disposed may be referred to as a primary column while the other columns may be referred to as a secondary column. In a preferred embodiment, the floating module includes three columns, one primary column and two secondary columns. Other numbers of columns for the floating module may also be useful. Due to the weight of the wind turbine column, it will contain less DF than the secondary column in a neutral state.

In other embodiments, the primary column may be disposed in the center of secondary columns. For example, three or more secondary columns may surround a primary column. In such configurations, the primary column need not be in fluid communication with the secondary columns. However, it is understood that primary and secondary columns may be in fluidic communication. Other configurations of the floating module may also be useful.

As described, the system of FIG. 2 includes active ballasting. In such applications, the DF filling the columns may be an intermediate-density DF. The intermediate density DF may have a density of about 1.5-2.5 g/cm$^3$. Other densities for DF filling the columns of an active ballasting system may also be useful.

In other embodiments, the system includes passive ballasting. In the case of passive ballasting, the columns of the floating module need not be in fluidic communication via flow pipes. This is because, in a passive ballasting system, the DF remains stationary. For example, the floating module is configured with DF which causes the system to be level.

However, it is understood that the columns of a passive ballasting system may be in fluidic communication. In a passive ballasting system, the DF may be a high-density DF. The high-density DF may include a density which is higher than that used in the active ballasting system. For example, the high-density DF may be about 2.5-3 g/cm$^3$. Other densities for the high-density DF used in a passive ballasting system may also be useful.

In another embodiment, the floating module is configured to replace seawater. For example, the floating module is filled with low-density DF. The low-density DF, for example, has a density of about 1.2 g/cm$^3$. In one embodiment, the low-density DF is dunite mud. For example, it contains a low-density fluid $d_1$ which is dunite mud. Other types of low-density DFs may also be useful. In some embodiments, the low-density DF may be formulated as:

$$DF=(P_1)d_1+(P_2)d_2.$$

In one embodiment, $d_1$ may be water while $d_2$ is intermediate-density particles. The size of the intermediate-density particles, for example, may be less than about 60 um. The intermediate-density particles, for example, may include dunite. Other types of fine intermediate-density particles may also be useful.

The offshore wind turbine platform may be a part of an offshore wind farm with numerous wind turbine platforms. The electricity generated by the wind turbine platforms is transmitted to an onshore substrate for further transmission. For example, the electricity is then transmitted to a power grid for distribution of the electricity for use by end users. In some embodiments, the electricity from the platforms may be transmitted to an offshore substation. The offshore substation then transmits the electricity to the onshore substation.

Figure 3:
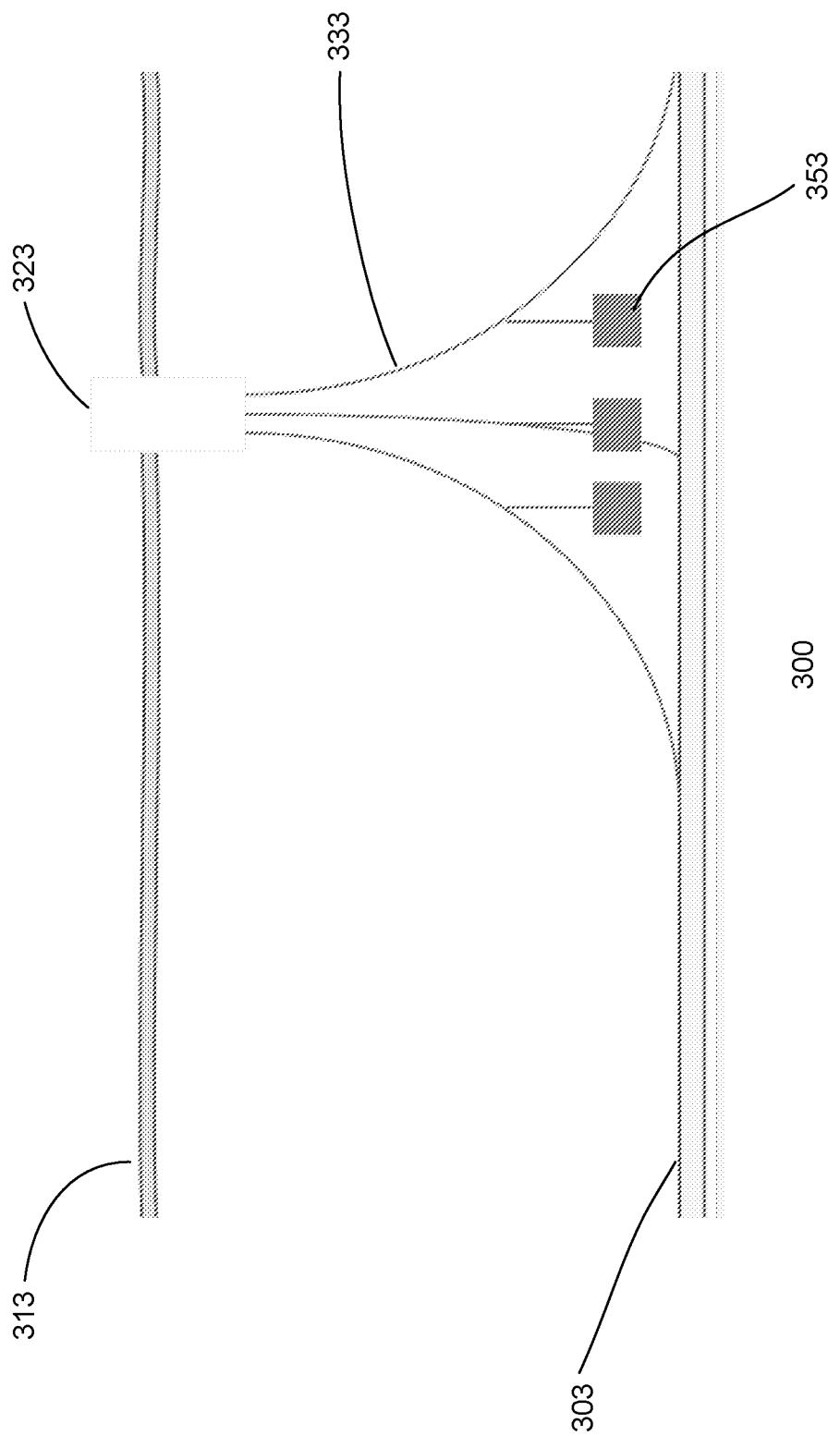
FIG. 3 shows a simplified embodiment of a catenary mooring system.

FIG. 3 shows a simplified embodiment of a catenary mooring system 300 for offshore applications, such as floating structures, including floating platforms or vessels. For example, the floating structures may include offshore wind turbine platforms or oil and gas drilling platforms. The catenary moory system may be employed for other offshore applications as well, including monohulls and semi-submersibles.

As shown in FIG. 3, a floating structure 300 floating on top 313 of a body of water, such as the sea. The floating structure is moored using catenaries 333. For example, the catenary system may include multiple catenaries, such as ropes or chains connected to the floating structure. For example, first ends of the catenaries are connected or extend from the floating structure. As for the second ends, they are configured to sit on the seabed 303 due to the weight of the catenaries.

In one embodiment, weights 353 are hung from the catenaries. The weights are configured to provide the proper tautness to ensure proper positioning of the floating structure. The weights, for example, are configured to produce an angle of the catenaries to the seabed of about 30-40°. Other configurations of the tautness of the catenaries may also be useful.

In one embodiment, a weight hanging from a catenary includes a weight container filled with DF. The weight container may be a cuboid-shaped container. Other shapes may also be useful. The weight container, in one embodiment, includes first and second openings. The first openings can be configured for connecting to an actuator, such as an air compressor unit, for injecting compressed air into the container. In one embodiment, the first opening is located at an upper portion or top of the container. As for the second opening, it is configured for filling the container with DF or removing DF from the container. In one embodiment, the second opening is located at, for example, the side of the lower portion of the container to facilitate the removal of the DF. Locating the second opening at the bottom of the container may also be useful, since it is configured to be floating. The openings, in one embodiment, can be configured to be opened or closed.

To install the catenary system, catenaries with filled containers may be hung from the floating structure. The openings in the containers, for example, are closed when filled DF. To deinstall or empty a container when in the water, an air conduit is connected to the first opening and a DF flow conduit is connected to the second opening. The openings are then opened. Compressed air is injected through the first opening, forcing the DF through to the second opening and up to, for example, the floating structure or ship. As the container is emptied, it floats towards the top of the sea. In the case that the DF need not be saved and is environmentally safe, it can be released into the sea.

In one embodiment, the DF can be an intermediate-density DF or high-density DF. The higher the density, the smaller the container needed. As described, the use of DF enables easy installation and removal of the catenary mooring system.

Figure 4:
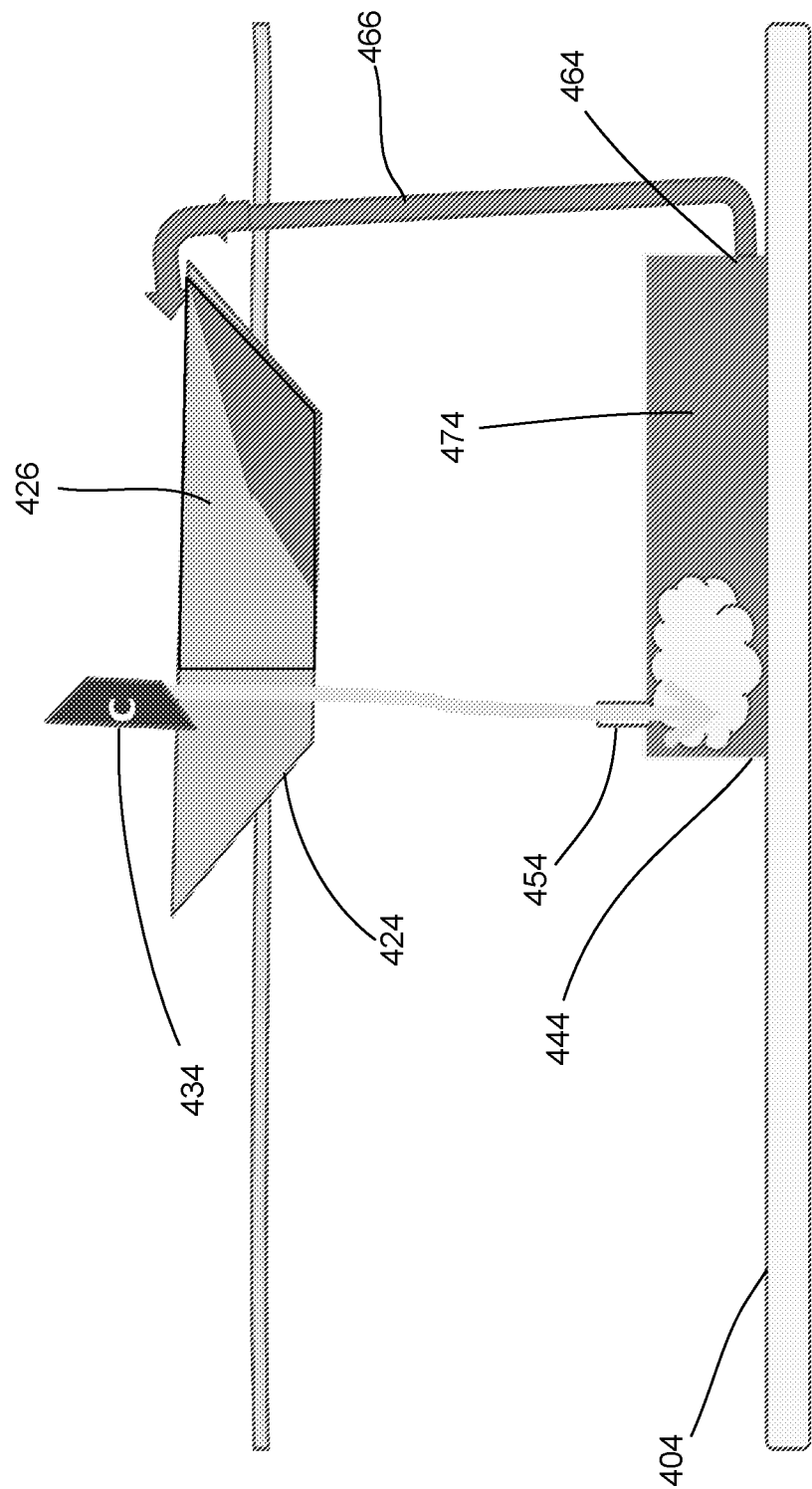
FIG. 4 shows a simplified embodiment of a gravity anchor.

FIG. 4 shows a simplified embodiment of a gravity anchor 444 for offshore applications, such as floating structures, including floating platforms or vessels. For example, the floating structures may include offshore wind turbine platforms or oil and gas drilling platforms. The gravity anchor system may be employed for other offshore applications as well, including monohulls and semi-submersibles.

The gravity anchor is configured to sit on the seabed 404. In one embodiment, the gravity anchor is a container filled with DF 474. The gravity container may be a cuboid-shaped container. Other shapes may also be useful. For example, the gravity container should have a shape which enables it sit stably on the seabed. The gravity anchor includes first and second openings 454 and 464. The first openings can be configured for connecting to an actuator. The actuator, in one embodiment. includes an air compressor unit for injecting compressed air into the container. In one embodiment, the first opening is located at the top of the gravity anchor. As for the second opening, it may be configured for filling the gravity anchor with DF or removing DF therefrom. In one embodiment, the second opening is located at the side of the lower portion of the container to facilitate the removal of the DF. The openings can be configured to be opened or closed.

In one embodiment, the gravity anchor is filled with DF and installed on the seabed. The openings, for example, are configured to be closed. For example, the filled gravity anchor can be positioned at the desired location and placed on the seabed. To deinstall the gravity anchor, DF is removed therefrom. To remove the DF from the gravity anchor a ship or vessel 424 may be employed. The vessel includes an actuator unit 434, such as a compressor unit, and a DF storage container 426. The actuator unit is connected to the first opening of the gravity anchor and a DF flow conduit 466 is connected to the second opening. The openings are configured to be opened. Compressed air is injected into the gravity anchor, forcing the DF to flow upwards to the DF storage container. As the gravity anchor is emptied, it floats toward the top of the sea. The floating gravity anchor can easily be towed by the vessel. In the case that the DF need not be saved and is environmentally safe, it can be released into the sea.

In one embodiment, the DF can be an intermediate-density DF or high-density DF. The higher the density, the smaller the container needed. As described, the use of DF enables easy installation and removal of the gravity anchor.

The present disclosure may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

The present disclosure may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

The invention claimed is:

1. A semisubmersible platform comprising:
   at least elongated hollow columns,
   a floating frame for bracing the hollow columns together to form a polygon, and
   dense fluid (DF) contained in the hollow columns, wherein the DF comprises a flowable stable DF having target density $D_T$, wherein DF is defined as $$DF=(P_1)d_1+(P_2)d_2+(P_3)d_3,$$

where
   $d_1$=low density fluid having density $D_1$,
   $d_2$=intermediate-density solid particles having density $D_2$,
   $d_3$=high-density solid particles having density $D_3$,
   $P_1$=volume percentage of $d_1$,
   $P_2$=volume percentage of $d_2$,
   $P_3$=volume percentage of $d_3$, and
   wherein
   $D_1<D_2<D_3$, and
   $D_T$ is less than $D_3$, and
   the dense fluid is configured to cause the columns to float, wherein
      the hollow columns containing the dense fluid, which are braced together, form a floating unit of the semisubmersible platform, and
      a volume of the hollow columns using dense fluid as ballast is smaller compared to hollow columns using seawater as ballast.

2. The platform of claim 1 comprises a deck disposed on top ends of the columns, wherein the deck supports components of the platform.

3. The platform of claim 1 comprises:
   three columns to form a triangle, the three columns include a primary column and two secondary columns; and
   a wind turbine module disposed on a primary column.

4. The platform of claim 1 wherein:
   one of the columns of the floating unit serves as a primary column and other columns of the floating unit serve as secondary columns; and
   further comprises a wind turbine module disposed on the primary column.

5. The platform of claim 4 wherein the primary and secondary columns form a polygon.

6. The platform of claim 5 wherein:
   the secondary columns form a polygon; and
   the primary column is disposed in about a center of the secondary columns.

7. The platform of claim 1 wherein;
   the columns are in fluidic communication;
   an active ballasting module configured to provide active ballasting between the columns to maintain the platform level.

8. The platform of claim 7 comprises an actuator unit to control flow of $D_F$ among the columns with compressed air for active ballasting of the platform.

9. The platform of claim 1 wherein $P_1$, $d_1$, $P_2$, $d_2$, $P_3$ and $d_3$ are selected in material and volume to produce a desired $D_T$ based on the application of the DF.

10. The platform of claim 1 wherein the DF comprises an intermediate dense fluid ($DF_I$) comprising $(P_1)$ $d_1+(P_2)d_2$ having an intermediate density $D_I$ mixed with $(P_3)$ $d_3$.

11. The platform of claim 10 wherein $D_I$ of $DF_I$ is about 2.8 g/cm³.

12. The platform of claim 1 wherein $d_2$ and $d_3$ comprise a tensoactive coating to improve stability of the DF.

13. A method of generating electricity comprising:
    installing an offshore wind turbine platform on a body of water, wherein the wind turbine platform comprises
       a floating unit which includes
          at least elongated hollow columns,
          a floating frame for bracing the hollow columns together to form a polygon, and
          dense fluid (DF) contained in the hollow columns, the DF comprises a flowable stable DF having target density $D_T$, wherein DF is defined as $$DF=(P_1)d_1+(P_2)d_2+(P_3)d_3,$$

where
          $d_1$=low density fluid having density $D_1$,
          $d_2$=intermediate-density solid particles having density $D_2$,
          $d_3$=high-density solid particles having density $D_3$,
          $P_1$=volume percentage of $d_1$,
          $P_2$=volume percentage of $d_2$,
          $P_3$=volume percentage of $d_3$, and
          wherein
          $D_1<D_2<D_3$, and
          $D_T$ is less than $D_3$, and
          the dense fluid is configured to cause the columns to float, and
          wherein a volume of the hollow columns using dense fluid as ballast is smaller compared to hollow columns using seawater as ballast;
       a wind turbine unit disposed on the floating unit, wherein the wind turbine unit is configured to generate electricity using wind power to turn a rotor assembly of the wind turbine unit; and
    transmitting the electricity generated by the wind turbine unit to an onshore substation.

14. The method of claim 13 wherein transmitting the electricity generated by the wind turbine unit to the onshore substation comprises:
    transmitting the electricity to an offshore substation; and
    transmitting the electricity from the offshore substation to the onshore substation.

15. The method of claim 13 comprises providing a plurality of wind turbine platforms using the DF for ballasting to form an offshore wind farm.

16. The method of claim 13 wherein:
    the floating module unit includes active ballasting;

the columns are configured to be in fluid communication with each other; and moving the DF among the column using a compressor unit to level the platform.

17. The method of claim 13 wherein the DF is formed by:

mixing $(P_1)d_1$ with $(P_2)d_2$ to form an intermediate DF $(DF_I)$ with an intermediate density $D_I$; and mixing $(P_3)d_3$, with $DF_I$ to form the DF with $D_T$.

18. The method of claim 17 wherein $D_I$ of $DF_1$ is about 2.8 g/cm$^3$.

19. The method of claim 13 comprises coating $d_2$ and $d_3$ with a tensoactive coating to improve stability of the DF.

* * * * *